(12) United States Patent
Tokumoto et al.

(10) Patent No.: US 10,144,470 B2
(45) Date of Patent: Dec. 4, 2018

(54) VEHICLE SEAT

(71) Applicants: TS TECH CO., LTD., Asaka-shi, Saitama (JP); Harley-Davidson Motor Company Group, LLC, Milwaukee, WI (US)

(72) Inventors: Hideki Tokumoto, Reynoldsburg, OH (US); Sam Schacht, Reynoldsburg, OH (US); Elizabeth Chambers, Reynoldsburg, OH (US); Justin Schrand, Reynoldsburg, OH (US); Katsuhiro Kiya, Reynoldsburg, OH (US); Anthony Senger, Milwaukee, WI (US); Kenneth Luckjohn, Milwaukee, WI (US); Ben McGinley, Milwaukee, WI (US)

(73) Assignees: TS Tech Co., Ltd., Saitama (JP); Harley-Davidson Motor Company Group, LLC, Milwaukee, WI (US)

( * ) Notice: Subject to any disclaimer, the term of this patent is extended or adjusted under 35 U.S.C. 154(b) by 9 days.

(21) Appl. No.: 15/487,708

(22) Filed: Apr. 14, 2017

(65) Prior Publication Data
US 2018/0297659 A1    Oct. 18, 2018

(51) Int. Cl.
*B62J 1/18*    (2006.01)
*B62J 1/22*    (2006.01)
(Continued)

(52) U.S. Cl.
CPC ............. *B62J 1/18* (2013.01); *B60N 2/58* (2013.01); *B60N 2/60* (2013.01); *B62J 1/22* (2013.01)

(58) Field of Classification Search
CPC ......... B62J 1/18; B62J 1/20; B62J 1/22; B62J 1/26; B60N 2/58; B60N 2/60
See application file for complete search history.

(56) References Cited

U.S. PATENT DOCUMENTS

| 595,111 | A | * | 12/1897 | Perry | ............... | B62J 1/26 |
| | | | | | | 297/199 |
| 3,807,793 | A | * | 4/1974 | Jacobs | ............... | B62J 1/18 |
| | | | | | | 297/214 |

(Continued)

FOREIGN PATENT DOCUMENTS

JP    2013-184625    9/2013

*Primary Examiner* — Timothy J Brindley
(74) *Attorney, Agent, or Firm* — Drinker Biddle & Reath LLP (57) ABSTRACT

A vehicle seat includes a cushion material and a cover for covering the cushion material. The cover includes a load receiving portion configured to receive a load of a seated occupant. The load receiving portion includes a large thickness portion and a small thickness portion that are located next to each other in a first direction that intersects with a thickness direction of the cover. Each of the large and small thickness portions includes an elastic layer compressive in the thickness direction and a lower cover layer located closer to the cushion material than the elastic layer in the thickness direction. The elastic layer of the small thickness portion is compressed such that the thickness of the small thickness portion is smaller than the thickness of the large thickness portion. The lower cover layer of the large thickness portion is partially cut off to form a cutoff portion.

9 Claims, 5 Drawing Sheets

(51) Int. Cl.
  *B60N 2/58* (2006.01)
  *B60N 2/60* (2006.01)

(56) References Cited

U.S. PATENT DOCUMENTS

| | | | | |
|---|---|---|---|---|
| 4,952,439 | A * | 8/1990 | Hanson | B62J 1/18 |
| | | | | 297/214 |
| 6,547,327 | B1 * | 4/2003 | Yates | B62J 1/20 |
| | | | | 297/200 |
| 9,751,440 | B2 * | 9/2017 | Dry | B60N 2/5642 |
| 9,770,642 | B2 * | 9/2017 | Wyner | A63B 71/08 |
| 2004/0095001 | A1 * | 5/2004 | Hancock | B62J 1/12 |
| | | | | 297/219.11 |
| 2014/0028064 | A1 * | 1/2014 | Truglio | B62J 1/18 |
| | | | | 297/214 |
| 2014/0327280 | A1 * | 11/2014 | Honma | B62J 1/007 |
| | | | | 297/195.12 |
| 2015/0175229 | A1 * | 6/2015 | Chiba | B62J 1/12 |
| | | | | 297/452.18 |
| 2015/0183476 | A1 * | 7/2015 | Chiba | B62J 1/12 |
| | | | | 297/214 |
| 2015/0274230 | A1 * | 10/2015 | Gregg | B62J 1/22 |
| | | | | 297/214 |
| 2016/0007671 | A1 * | 1/2016 | Prust | A47C 27/144 |
| | | | | 2/411 |
| 2017/0190370 | A1 * | 7/2017 | Porter | B62J 1/002 |
| 2017/0355410 | A1 * | 12/2017 | Yim | B62J 1/08 |
| 2018/0037284 | A1 * | 2/2018 | Chiba | B62J 1/12 |

* cited by examiner

VEHICLE SEAT

BACKGROUND

The present disclosure relates to a vehicle seat including a cushion material and a cover having a layered structure and particularly pertains to a vehicle seat in which a large thickness portion and a small thickness portion are provided in a load receiving portion of a cover.

There are conventionally known vehicle seats each of which is configured such that a cushion material is covered by a cover, and the cover may have a layered structure. A cover applied in a vehicle seat described, for example, in Japanese Unexamined Patent Application Publication No. 2013-184625 (JP2013-184625A) has a three-layered structure of a lining material, a cover pad, and an outer cover.

Also, a cover having a layered structure may include two kinds of portions (a large thickness portion and a small thickness portion) having thickness different from each other. The large thickness portion and the small thickness portion may be provided in a portion (hereinafter referred to as a load receiving portion) of the cover, which is configured to receive a load from an occupant of a vehicle as an occupant seated on a seat, in order to improve the design of the load receiving portion.

The structure of the large thickness portion and the structure of the small thickness portion are herein described. Each of the large thickness portion and the small thickness portion includes a compressive layer (hereinafter referred to as an elastic layer) such as a pad and an upper cover layer positioned to be exposed. The elastic layer of the small thickness portion is compressed so that the thickness of the small thickness portion may be smaller than the thickness of the large thickness portion. In addition, the large thickness portion and the small thickness portion are provided in the load receiving portion such that each large thickness portion is located next to each small thickness portion in a front to back direction or a width direction (right to left direction) of the vehicle.

In the load receiving portion of the cover where the large thickness portion and the small thickness portion are provided, each large thickness portion located next to each small thickness portion may be noticeably bulged due to the formation of the small thickness portion. In other words, the large thickness portions and the small thickness portions are provided; therefore, unevenness of the load receiving portion may be noticeable.

SUMMARY

The present disclosure has been made in view of the above-described problem, and an embodiment of the present disclosure provides a vehicle seat in which even if large thickness portions and small thickness portions are provided in a cover, unevenness can be prevented from being visibly noticeable.

The afore-mentioned problem is solved by a vehicle seat according to an embodiment of the present disclosure, the vehicle seat including: a cushion material and a cover adapted to cover the cushion material. The cover includes a load receiving portion configured to receive a load of an occupant seated on the vehicle seat. The load receiving portion includes a large thickness portion and a small thickness portion that are located next to each other in a first direction intersecting with a thickness direction of the cover. Each of the large thickness portion and the small thickness portion includes an elastic layer which is compressive in the thickness direction and a lower cover layer located closer to the cushion material than the elastic layer in the thickness direction. The elastic layer of the small thickness portion is compressed such that the thickness of the small thickness portion is smaller than the thickness of the large thickness portion. The lower cover layer of the large thickness portion is partially cut off to form a cutoff portion.

In the vehicle seat configured as described according to an embodiment of the present disclosure, the large thickness portion and the small thickness portion are provided in the load receiving portion of the cover, and each of the large thickness portion and the small thickness portion includes the elastic layer and the lower cover layer located closer to the cushion material than the elastic layer. In addition, the cutoff portion is provided in the lower cover layer of the large thickness portion. The cutoff portion is provided in this manner; thereby, tension applied to the lower cover layer of the large thickness portion is relieved. Consequently, the elastic layer of the large thickness portion, which is supported by the lower cover layer moves slightly downward. As a result, bulging of the large thickness portion is reduced. In other words, unevenness of the load receiving portion where the large thickness portion and the small thickness portion are provided may be prevented from being noticeable.

According to another embodiment of the present disclosure, in the vehicle seat, the small thickness portion may include a first extending portion that extends in the first direction where the large thickness portion and the small thickness portion are located next to each other and a second extending portion that extends to intersect with the first extending portion, and the large thickness portion may be located next to the second extending portion to extend along the second extending portion. According to the foregoing configuration, the unevenness between the second extending portion and the large thickness portion of the small thickness portion can be prevented from being noticeable.

According to still another embodiment of the present disclosure, in the vehicle seat, the small thickness portion may include a pair of second extending portions that are spaced apart from each other and include the second extending portion, and the cutoff portion may be formed in the lower cover layer of the large thickness portion positioned to be interposed between the pair of second extending portions. According to the foregoing configuration, in a location where the large thickness portion is interposed between the pair of second extending portions, the unevenness between each of the second extending portions and the large thickness portion can be prevented from being noticeable.

According to a further embodiment of the present disclosure, in the vehicle seat, the pair of second extending portions may be spaced apart from each other in a front to back direction of the vehicle seat, and each of the pair of second extending portions, the large thickness portion positioned to be interposed between the pair of second extending portions, and the cutoff portion may extend in a width direction of the vehicle seat. According to the foregoing configuration, in a location where the large thickness portion is interposed between the pair of second extending portions in the front to back direction of the vehicle seat, the unevenness between each of the second extending portions and the large thickness portion can be prevented from being noticeable.

According to a still further embodiment of the present disclosure, in the vehicle seat, the cover may further include an upper cover layer separated further from the cushion material than the elastic layer in the thickness direction, and the elastic layer may be interposed between the lower cover layer and the upper cover layer. The lower cover layer of the small thickness portion may be continuously formed with the lower cover layer of the large thickness portion, and the upper cover layer of the small thickness portion may be continuously formed with the upper cover layer of the large thickness portion. In the foregoing configuration, the lower cover layer of the small thickness portion is continuously formed with the lower cover layer of the large thickness portion. Likewise, the upper cover layer of the small thickness portion is continuously formed with the upper cover layer of the large thickness portion. In addition, the elastic layer is interposed between the lower cover layer and the upper cover layer. When the small thickness portion is formed as in the configuration described above, the upper cover layer of the large thickness portion and the lower cover layer of the large thickness portion are likely to be stretched. Accordingly, the unevenness between the small thickness portion and the large thickness portion tends to be noticeable. In such a case, the cutoff portion is provided in the lower cover layer of the large thickness portion; thereby, the effect of preventing the unevenness from being noticeable is more significantly achieved by the present invention.

According to an embodiment of the present disclosure, in the vehicle seat, the cutoff portion may be a cut formed in the lower cover layer. Also, the cutoff portion may be a hole formed in the lower cover layer. According to either one of the foregoing two configurations, the cutoff portion can be easily provided.

According to another embodiment of the present disclosure, in the vehicle seat, the cutoff portion may be provided at a central portion of the lower cover layer of the large thickness portion in the first direction where the large thickness portion and the small thickness portion are located next to each other. In the foregoing configuration, the cutoff portion is provided in the central portion of the lower cover layer of the large thickness portion in the first direction where the large thickness portion and the small thickness portion are located next to each other. The cutoff portion is positioned in such a manner; thereby, tension applied to the large thickness portion can be effectively relieved. As a result, the unevenness between the large thickness portion and the small thickness portion can be effectively prevented from being noticeable.

According to still another embodiment of the present disclosure, in the vehicle seat, the vehicle seat may be a straddle seat on which an occupant can sit straddled, and the load receiving portion may be a portion of the cover on which the buttocks of the occupant seated on the vehicle seat are rested. According to the foregoing configuration, the unevenness between the small thickness portion and the large thickness portion in the portion (load receiving portion) of the straddle seat on which the buttocks of the seated occupant are rested is reduced. Therefore, the occupant can be prevented from having an odd feeling (an uncomfortable feeling when seated) due to the unevenness.

According to the vehicle seat of an embodiment of the present disclosure, the unevenness can be prevented from being noticeable in the load receiving portion where the large thickness portion and the small thickness portion are provided. According to the vehicle seat of another embodiment of the present disclosure, the unevenness can be prevented from being noticeable between the large thickness portion and a portion (the second extending portion) of the small thickness portion, which extends in the direction intersecting with the first direction where the large thickness portion and the small thickness portion are located next to each other. According to the vehicle seat of still another embodiment of the present disclosure, in a location where the large thickness portion is interposed between the pair of second extending portions, the unevenness between each of the second extending portions and the large thickness portion can be further prevented from being noticeable. According to the vehicle seat of a further embodiment of the present disclosure, in a location where the large thickness portion is interposed between the pair of second extending portions in the front to back direction of the vehicle seat, the unevenness between each of the second extending portions and the large thickness portion can be further prevented from being noticeable. According to the vehicle seat of a still further embodiment of the present disclosure, even in such a structure that the upper cover layer of the large thickness portion and the lower cover layer of the large thickness portion are likely to be stretched, and the unevenness between the small thickness portion and the large thickness portion generally tends to be noticeable, the cutoff portion is provided in the lower cover layer of the large thickness portion; thereby, the unevenness can be prevented from being noticeable. According to the vehicle seat of an embodiment of the present disclosure, the cutoff portion can be easily provided in the lower cover layer of the large thickness portion. According to the vehicle seat of another embodiment of the present disclosure, tension applied to the large thickness portion can be effectively relieved; therefore, the unevenness between the large thickness portion and the small thickness portion can be effectively prevented from being noticeable. According to the vehicle seat of still another embodiment of the present disclosure, the unevenness between the small thickness portion and the large thickness portion in the portion (load receiving portion) of the straddle seat on which the buttocks of the occupant are rested is reduced. Therefore, the occupant can be prevented from having an odd feeling (an uncomfortable feeling when seated) due to the unevenness.

DETAILED DESCRIPTION

A vehicle seat according to various embodiments of the present disclosure (hereinafter referred to as an embodiment) is described below. The embodiments below are merely examples for facilitating understanding of the invention, and the embodiments do not restrict the invention. In other words, it will be understood that changes or modifications may be made to the embodiments without departing from the scope of the invention and that the invention may include equivalents thereof.

A seat for an automotive two-wheeled vehicle (hereinafter referred to as a two-wheeled vehicle seat S) is hereinafter taken as an example of a vehicle seat, and the structure of the two-wheeled vehicle seat S is described. The embodiments of the present disclosure may be applied to vehicle seats mounted on vehicles other than automotive two-wheeled vehicles, for example, three-wheeled vehicles, four-wheeled vehicles such as passenger vehicles, ships, or airplanes.

In the following description, "a front to back direction" corresponds to a front to back direction of the two-wheeled vehicle seat S and coincides with a travelling direction of an automotive two-wheeled vehicle. "A width direction" corresponds to a width direction (a right to left direction) of the two-wheeled vehicle seat S and coincides with a right to left direction of the automotive two-wheeled vehicle in a front view. "A thickness direction" corresponding to a thickness direction of a cover 10 described below is a direction perpendicular to the front to back direction and the width direction, and the thickness direction coincides with a vertical direction when the automotive two-wheeled vehicle stands upright on a horizontal surface.

Also, hereinafter, one side exposed to the outside air in the thickness direction is referred to as "an upper side" for convenience, and the other side opposite to the one side in the thickness direction is referred to as "a lower side" for convenience.

Furthermore, hereinafter, in explaining the orientations of respective components configuring the two-wheeled vehicle seat S, the orientations in a state where the automotive two-wheeled vehicle stands upright on a horizontal surface (the vehicle is not inclined right or left) are described unless otherwise specified.

Figure 1:
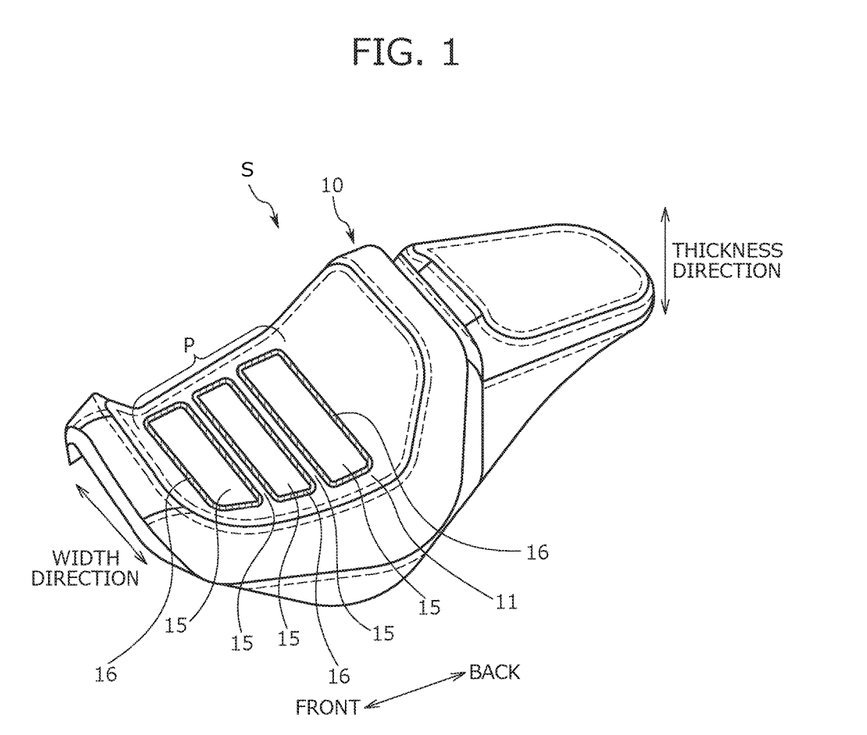
FIG. 1 is a perspective view illustrating the outer appearance of a vehicle seat according to an embodiment.
Figure 2:
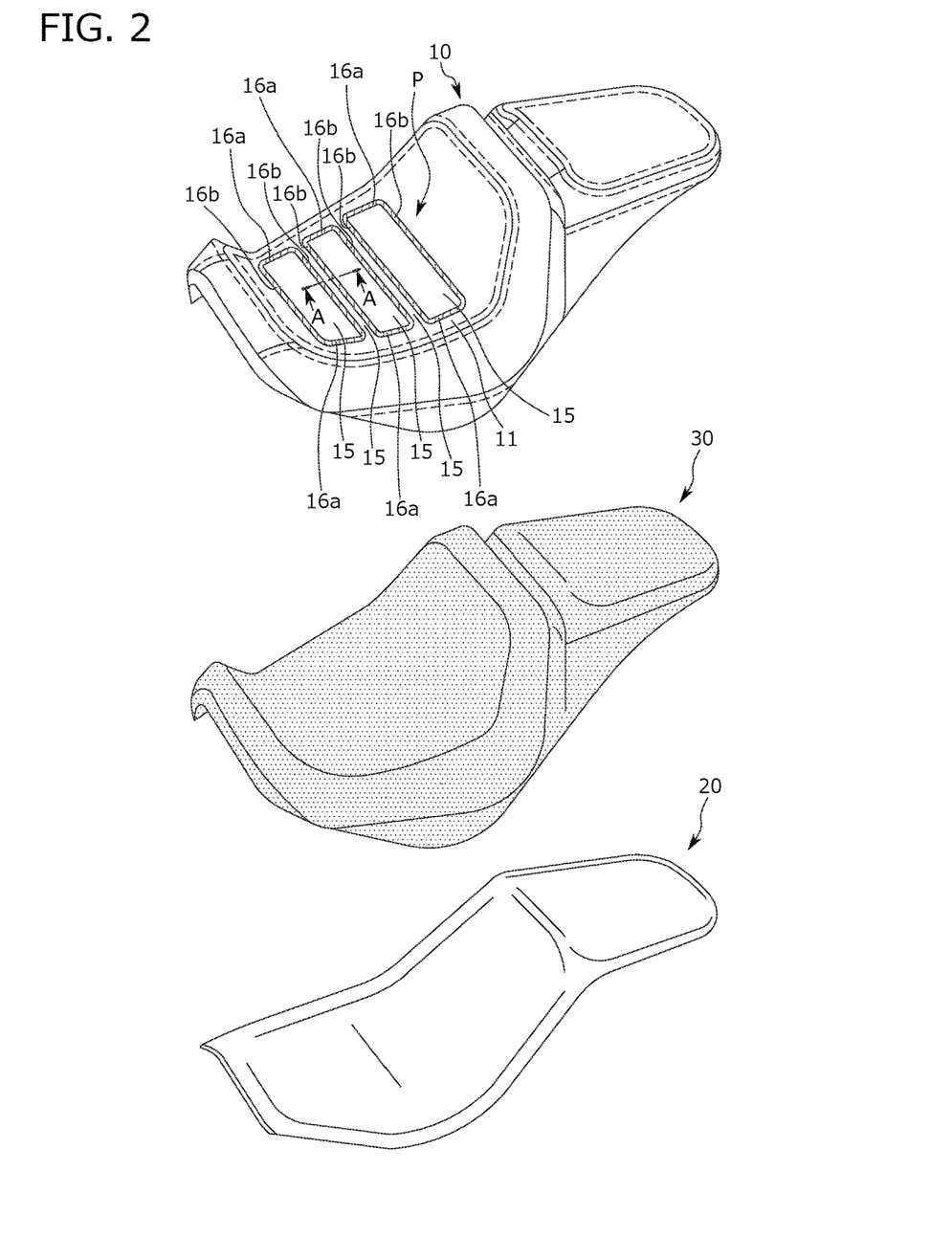
FIG. 2 is an exploded view illustrating components of the vehicle seat according to the embodiment.

First, the structure of the two-wheeled vehicle seat S is described with reference to FIG. 1 and FIG. 2. FIG. 1 is a perspective view illustrating the outer appearance of the two-wheeled vehicle seat S. FIG. 2 is a view illustrating components of the two-wheeled vehicle seat S, and is a view illustrating the components into which the two-wheeled vehicle seat S is disassembled. In FIG. 1, the front to back direction, the width direction, and the thickness direction are indicated by arrows.

The two-wheeled vehicle seat S is a straddle seat on which a rider as an occupant of the automotive two-wheeled vehicle can sit straddled. The two-wheeled vehicle seat S is mounted on the automotive two-wheeled vehicle while being exposed to the outer side. Also, the two-wheeled vehicle seat S shown in FIG. 1 is a tandem seat configured such that respective riders can be seated on front and rear portions of the seat. In other words, a front portion of the two-wheeled vehicle seat S is configured as a front seat and a rear portion of the two-wheeled vehicle seat S is configured as a rear seat. In addition, the embodiments of the present disclosure can be applied not only to a tandem seat but also to a single seat.

As shown in FIG. 2, the two-wheeled vehicle seat S includes as the components: a bottom plate 20; a cushion pad 30 as a cushion material; and a cover 10. The two-wheeled vehicle seat S is configured such that the cushion pad 30 as the cushion material is mounted on a top surface of the bottom plate 20 and a surface of the cushion pad 30 is covered by the cover 10.

The cover 10 is a member providing the outer appearance of the two-wheeled vehicle seat S and is exposed to the outside air. More specifically, the cover 10 is configured to cover an upper portion, side portions, and end portions in the front to back direction of the cushion pad 30 mounted on the bottom plate 20. As shown in FIG. 1 and FIG. 2, a portion of the cover 10, which covers the upper portion of the cushion pad 30, has a load receiving portion 11. The load receiving portion 11 is configured to receive a load of a rider seated on the two-wheeled vehicle seat S. More specifically, the buttocks of the rider seated on the vehicle seat are rested on the load receiving portion 11. In other words, the rider of the automotive two-wheeled vehicle sits on the two-wheeled vehicle seat S while straddling a portion of the two-wheeled vehicle seat S where the load receiving portion 11 is provided.

In the embodiment, a predetermined shaped pattern is formed in the load receiving portion 11 so that a rider can easily identify the load receiving portion 11 from other portions of the cover 10 where the load receiving portion 11 is not provided. In a case shown in FIG. 1 or other drawings, a pattern P of a plurality of (specifically three) rectangular frames arranged next to each other in the front to back direction is formed in the load receiving portion 11.

Figure 3:
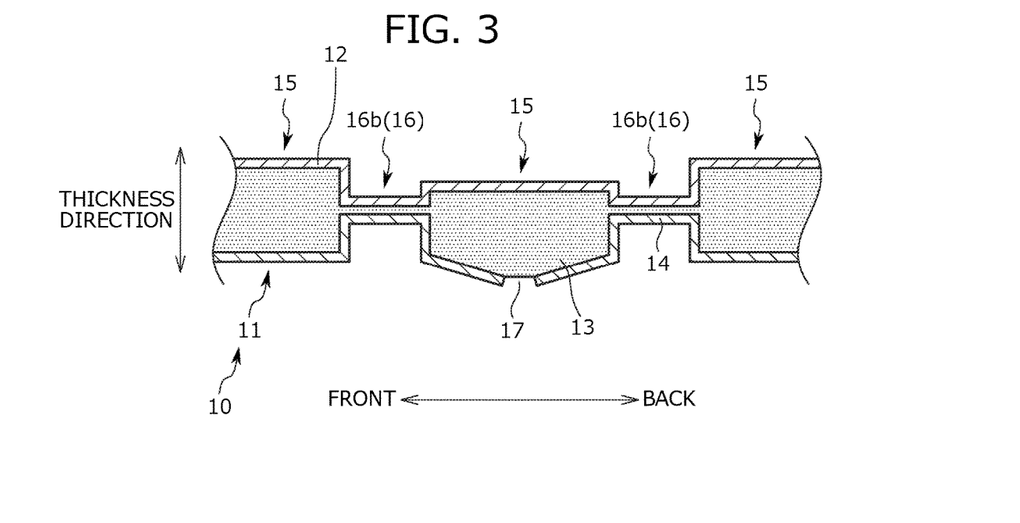
FIG. 3 is a cross-sectional view taken along the line A-A of FIG. 2.

Next, the structure of the cover 10 is described in detail with reference to FIG. 3. FIG. 3 is a cross-sectional view taken along the line A-A of FIG. 2, illustrating the cross-section structure of the cover 10. In FIG. 3, the front to back direction and the thickness direction are indicated by arrows.

The cover 10 according to the embodiment has a layered structure where three layers are laminated, as shown in FIG. 3. Specifically, an upper cover layer 12, an elastic layer 13, and a lower cover layer 14 are provided in the mentioned order from the exterior (the exposed side). The upper cover layer 12 is a layer positioned to be further separated from the cushion pad 30 than the elastic layer 13 in the thickness direction. Specifically, the upper cover layer 12 is formed by a natural leather sheet or an artificial leather sheet, a vinyl chloride sheet, a styrene sheet, an olefin sheet, or a thermoplastic polyurethane elastomer sheet.

The lower cover layer 14 is a layer positioned closer to the bottom plate 20 than the elastic layer 13 in the thickness direction. Specifically, the lower cover layer 14 is formed of a translucent sheet made of vinyl chloride or polyethylene. The elastic layer 13 is a layer compressive in the thickness direction and is formed, for example, of urethane foam. Also, the elastic layer 13 is interposed between the upper cover layer 12 and the lower cover layer 14 in the thickness direction.

The cover 10 according to the embodiment includes the load receiving portion 11 as described above. The pattern P of the three rectangular frames arranged next to each other in the front to back direction is formed in the load receiving portion 11. Welding processing is performed on locations of the cover 10 where the rectangular frames are to be formed; thereby, each of the rectangular frames is formed.

Welding processing is a processing in which target locations (locations to be welded) of the cover 10 are compressed (crushed) by a welder (not shown) so that the upper cover layer 12 and the lower cover layer 14 are brought close to each other in the target locations. In the welding processing according to the embodiment, the cover 10 is crushed from two directions, i.e. opposite directions in the thickness direction. In other words, in the embodiment, the welding processing is performed on the cover 10 in such a way that the cover 10 is compressed from both the top side of the cover 10 (the upper cover layer 12 side of the cover 10) and the bottom side of the cover 10 (the lower cover layer 14 side of the cover 10).

The foregoing welding processing is performed; therefore, two kinds of portions (hereinafter referred to as at least one large thickness portion 15 and at least one small thickness portion 16) having thickness different from each other are formed in the load receiving portion 11. The at least one small thickness portion 16 is smaller in thickness than the at least one large thickness portion 15, and specifically, includes a plurality of small thickness portions 16 forming the rectangular frames of the pattern P. The at least one large thickness portion 15 is a portion other than the small thickness portions 16 in the load receiving portion 11 and includes a plurality of large thickness portions 15. The large thickness portions 15 are larger in thickness than the small thickness portions 16.

As shown in FIG. 3, the large thickness portions 15 and the small thickness portions 16 are provided such that each of the large thickness portions 15 is located next to an adjacent small thickness portion 16 in the front to back direction (that is, in a first direction that intersects with the thickness direction). Also, as shown in FIG. 3, each of the large thickness portion 15 and the small thickness portion 16 includes the upper cover layer 12, the elastic layer 13, and the lower cover layer 14. The lower cover layer 14 of the small thickness portion 16 is continuously formed with the lower cover layer 14 of the large thickness portion 15. Likewise, the upper cover layer 12 of the small thickness portion 16 is continuously formed with the upper cover layer 12 of the large thickness portion 15. The elastic layer 13 of the small thickness portion 16 is continuously formed with the elastic layer 13 of the large thickness portion 15.

The elastic layer 13 of the small thickness portion 16 is compressed by the welding processing so that the thickness of the small thickness portion 16 is smaller than the thickness of the large thickness portion 15.

Locations where the small thickness portions 16 are to be formed in the embodiment are described with reference to FIG. 2. In the embodiment, the small thickness portions 16 are provided so as to form the pattern P of the plurality of rectangular frames arranged next to each other in the front to back direction. Each of the small thickness portions 16 is formed so as to surround a predetermined area in the load receiving portion 11. More specifically, the small thickness portion 16 includes two different extending portions (hereinafter referred to as at least one first extending portion 16a and at least one second extending portion 16b) that form each of the rectangular frames of the pattern P.

The at least one first extending portion 16a includes a plurality of first extending portions 16a, extends in the front to back direction (that is, in the first direction where the large thickness portion 15 and the small thickness portion 16 are located next to each other), and forms the short side of each rectangular frame. The at least one second extending portion 16b includes a plurality of second extending portions 16b and extends relatively long in the width direction so as to intersect with the first extending portion 16a (technically, so as to be substantially orthogonally oriented to the first extending portion 16a). The second extending portion 16b forms the long side of each rectangular frame. In the embodiment, each of the first extending portion 16a and the second extending portion 16b form a continuous extension, however other embodiments are not limited thereto. Alternatively, each of the first extending portion 16a and the second extending portion 16b may extend discontinuously.

Also, the plurality of the second extending portions 16b (which are specifically twice the number of rectangular frames) are arranged next to each other in the front to back direction. In other words, the second extending portions 16b includes a pair of second extending portions 16b spaced apart from each other in the front to back direction. Here, the pair of second extending portions 16b is configured such that the second extending portions 16b belong to the respective different rectangular frames in the pattern P and such that the second extending portions 16b are located next to each other. It will be understood that in FIG. 2, the second extending portion 16b in the second row from the front and the second extending portion 16b in the third row from the front correspond to the pair of second extending portions 16b. Also, in FIG. 2, the second extending portion 16b in the fourth row from the front and the second extending portion 16b in the fifth row from the front correspond to the pair of second extending portions 16b.

The two second extending portions 16b belonging to the same rectangular frame in the pattern P and connected to each other by the first extending portions 16a are hereinafter referred to as "two second extending portions 16b forming the opposite sides" so as to be distinguished from "the pair of second extending portions 16b".

A clearance between the pair of second extending portions 16b is slightly smaller than a clearance between the two second extending portions 16b forming the opposite sides. In other words, the respective large thickness portions 15 are positioned to be interposed between the pair of second extending portions 16b and between the two second extending portions 16b forming the opposite sides. In addition, the large thickness portion 15 interposed between the pair of second extending portions 16b is smaller in the front to back direction than the large thickness portion 15 interposed between the two second extending portions 16b forming the opposite sides.

Also, as shown in FIG. 2, the large thickness portion 15 interposed between the pair of second extending portions 16b is located next to (technically, closely adjacent to) each of the pair of second extending portions 16b so as to extend along each second extending portion 16b. More specifically, each of the pair of second extending portions 16b and the large thickness portion 15 interposed between the pair of second extending portions 16b extend in the width direction.

Figure 4:
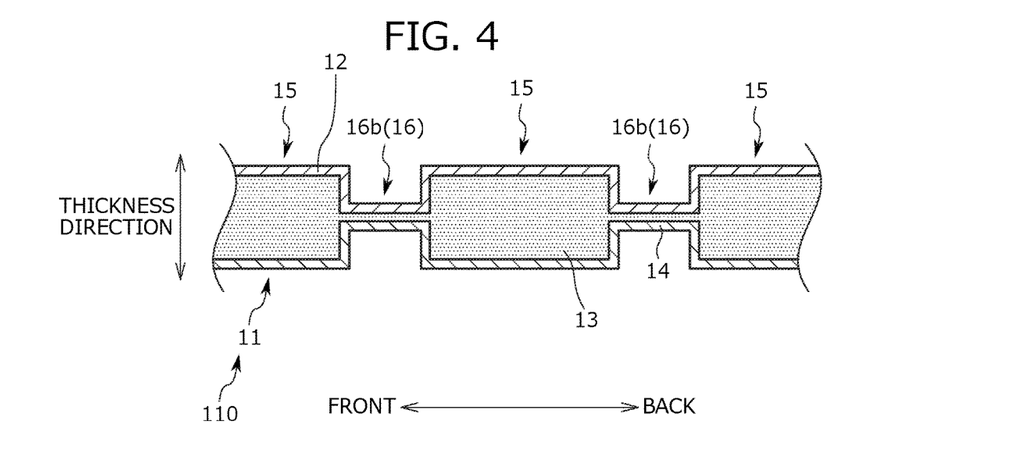
FIG. 4 is a view illustrating a cross-section structure of a cover according to a reference example.

As described above, in the cover 10 according to the embodiment, the large thickness portions 15 and the small thickness portions 16 are provided in the load receiving portion 11. One of the large thickness portions 15 is technically positioned to be interposed between the pair of second extending portions 16b. In such a structure, in general as shown in FIG. 4, the large thickness portion 15 located next to the small thickness portion 16 is noticeably bulged. FIG. 4 is a view illustrating the cross-section structure of a cover 110 according to a reference example and corresponding to FIG. 3.

As described above, in the cover 10 where the small thickness portions 16 are formed, unevenness between the large thickness portions 15 and the small thickness portions 16 may be generally visibly noticeable. Also, the unevenness may be more noticeable in the structure where respective layers (that is, the upper cover layer 12, the elastic layer 13, and the lower cover layer 14) of the cover 10 are provided such that the upper cover layer 12, the elastic layer 13, and the lower cover layer 14 of each of the large thickness portions 15 are respectively continuously formed with the upper cover layer 12, the elastic layer 13, and the lower cover layer 14 of each of the small thickness portions 16.

Figure 5:
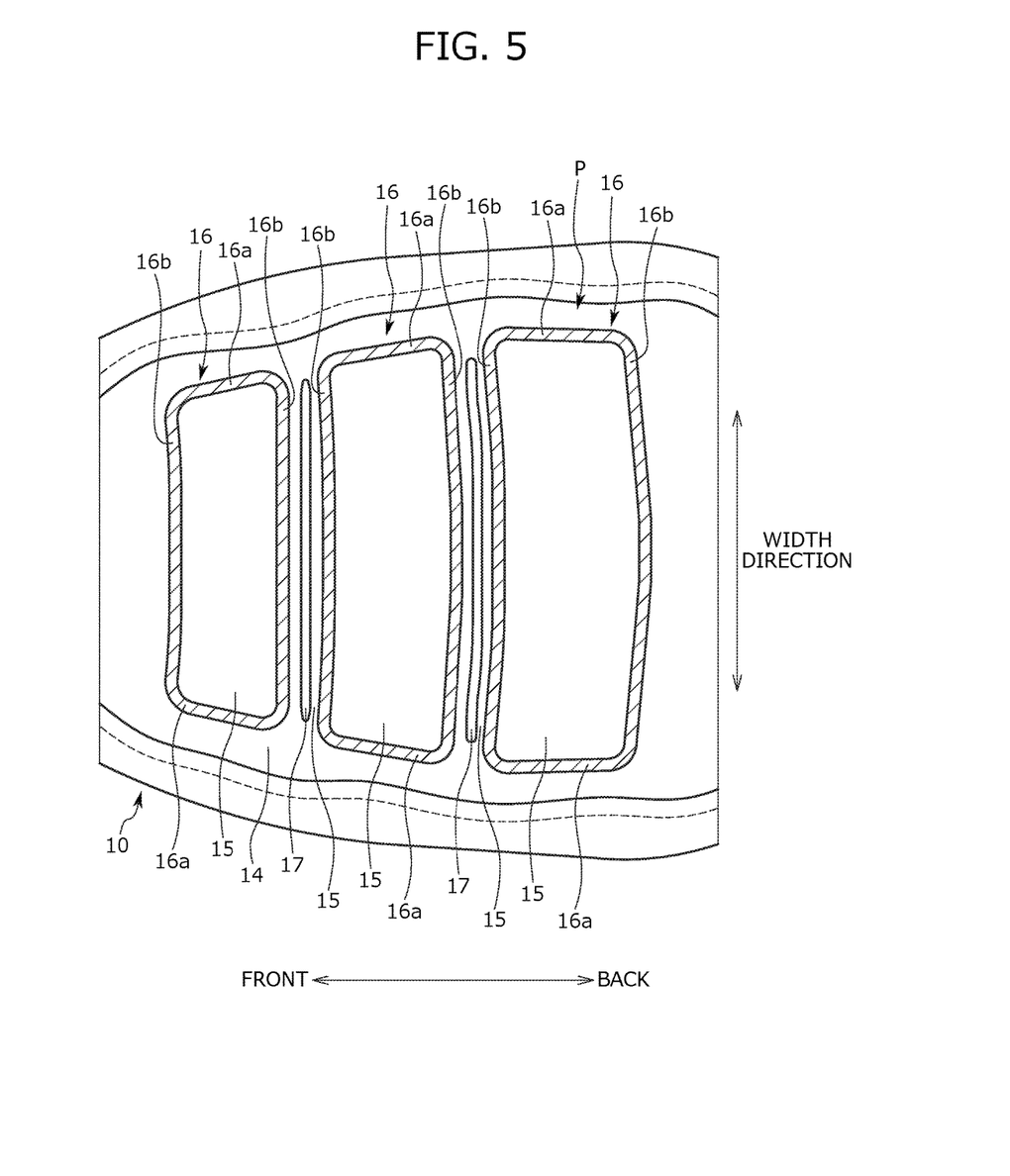
FIG. 5 is a view illustrating the cover according to the embodiment when viewed from the bottom side.

Accordingly, in the embodiment, slit-shaped holes 17 (hereinafter referred to as slit holes 17) are each formed in the lower cover layer 14 of the large thickness portion 15 positioned to be interposed between the pair of second extending portions 16b, as measures to prevent the unevenness from being noticeable. As shown in FIG. 5, the slit hole 17 corresponds to a cutoff portion. The lower cover layer 14 of the large thickness portion 15 is partially cut off to form the cutoff portion. FIG. 5 is a view illustrating the cover 10 according to the embodiment when viewed from the bottom side (from the lower cover layer 14). In FIG. 5, the front to back direction and the width direction are indicated by arrows.

The slit hole 17 is now described in detail. The slit hole 17 is formed to be elongated in the width direction. In the embodiment, the slit hole 17 is formed slightly shorter than each of the pair of second extending portions 16b. Also, as shown in FIG. 5, the slit hole 17 is provided in a central portion of the lower cover layer 14 of the large thickness portion 15 in the front to back direction (in the first direction where the large thickness portion 15 and the small thickness portion are provided next to each other). In other words, the slit hole 17 is formed substantially in the center of the pair of second extending portions 16b in the front to back direction.

As described above, the slit hole 17 is formed in the lower cover layer 14 of the large thickness portion 15 interposed between the pair of second extending portions 16b. Therefore, tension applied to the lower cover layer 14 of the large thickness portion 15 is relieved (technically, eliminated). Consequently, as shown in FIG. 3, the elastic layer 13 supported by the lower cover layer 14 of the large thickness portion 15 and the upper cover layer 12 located above the elastic layer 13 of the large thickness portion 15 move downward. As a result, the foregoing bulge of the large thickness portion 15 is reduced as seen from FIG. 3 and FIG. 4.

As described above, in the cover 10 according to the embodiment, the unevenness of the load receiving portion 11 where the large thickness portions 15 and the small thickness portions 16 are provided can be prevented from being noticeable. Also, as just described, in the embodiment, since the layers of the cover 10 are provided such that the respective layers of the large thickness portion 15 are continuously formed with the respective layers of the small thickness portions 16, the unevenness tends to be more noticeable. In such a case, the advantage that the unevenness can be prevented from being noticeable by the structure where the slit hole 17 is provided in the lower cover layer 14 of the large thickness portion 15 is particularly more meaningful. Furthermore, in the embodiment, the slit hole 17 is formed in the central portion of the lower cover layer 14 of the large thickness portion 15 in the front to back direction. Therefore, the unevenness between the large thickness portion 15 and the small thickness portion 16 can be effectively prevented from being noticeable.

Figure 6:
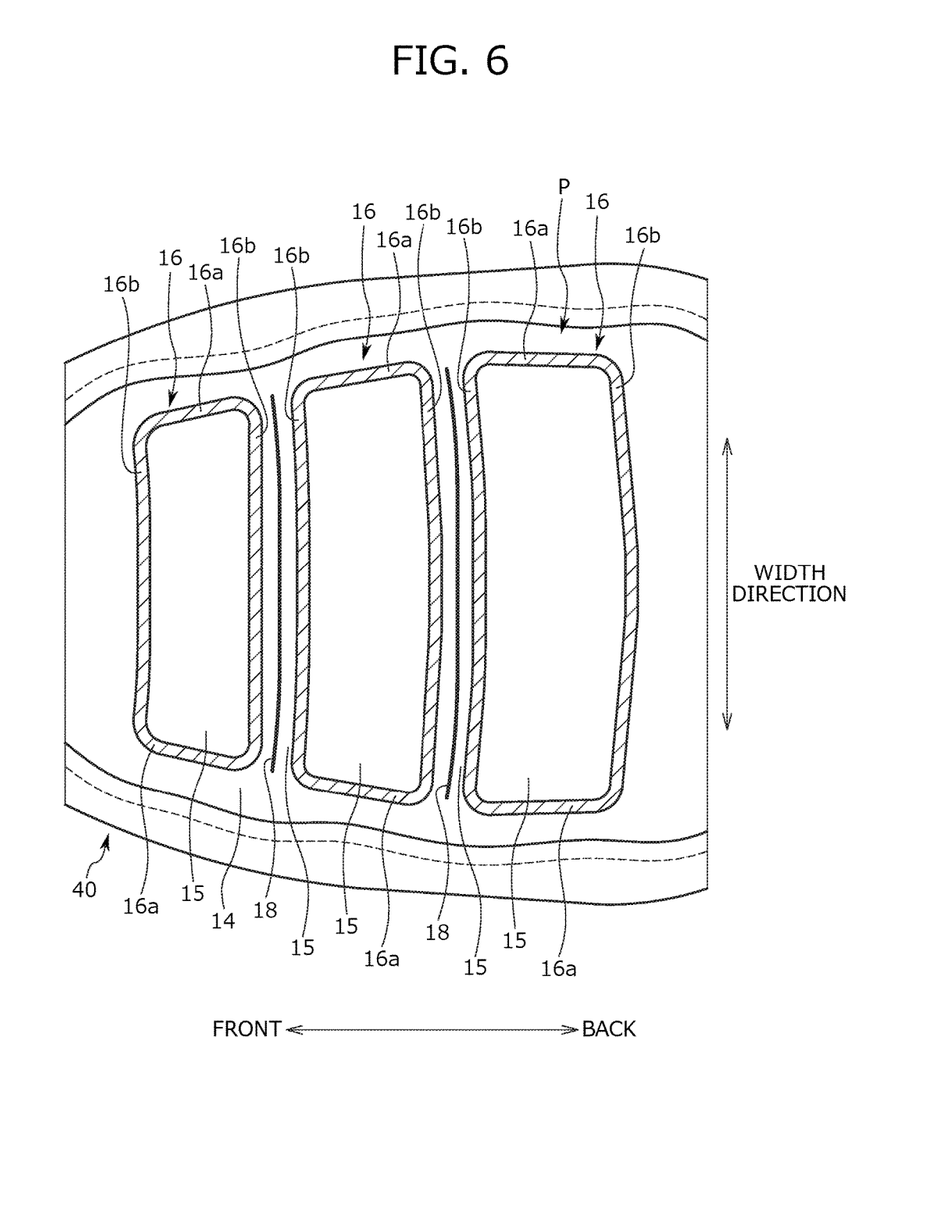
FIG. 6 is a view illustrating the structure of a cover according to a modified example.

As describe above, regarding the vehicle seat (specifically, the two-wheeled vehicle seat S) according to the embodiment, the structure of the cover 10 has been mainly described. The structure of the cover 10 is not limited to the foregoing description, and the cover 10 may be configured in a different manner. For example, in the foregoing embodiment, the slit hole 17 is formed as the cutoff portion in the lower cover layer 14 of the large thickness portion 15 in order to prevent the unevenness between the large thickness portion 15 and the small thickness portion 16 from being noticeable; however, the cutoff portion is not limited to a hole such as the slit hole 17. Alternatively, as shown in FIG. 6, the cutoff portion may be a cut 18 formed in the lower cover layer 14 of the large thickness portion 15. FIG. 6 is a view illustrating the structure of a cover 40 according to a modified example and corresponding to FIG. 5.

Also, in the foregoing embodiment, the welding processing is performed on the locations of the cover 10 where the small thickness portions 16 are to be formed; thereby, the small thickness portions 16 are formed. As long as each of the small thickness portions 16 is formed in such a way that the elastic layer 13 of the small thickness portion 16 is further compressed (crushed) than the elastic layer 13 of the large thickness portion 15, the small thickness portion 16 may be formed by a compression processing other than the welding processing.

Furthermore, in the foregoing embodiment, the small thickness portions 16 are formed in such a way that the pattern P of the plurality of rectangular frames is formed. The pattern P (design) configured by the small thickness portions 16 is not limited to a specific pattern. For example, the small thickness portions 16 may be formed so as to form a pattern of a plurality of lines arranged next to each other in the front to back direction (that is, so as to form a vertical striped pattern). Alternatively, the small thickness portions 16 may be formed so as to form a pattern of a plurality of laterally-facing U-shaped portions arranged next to each other in the front to back direction.

What is claimed is:

1. A vehicle seat comprising:
a cushion material; and
a cover adapted to cover the cushion material;
wherein:
the cover includes a load receiving portion configured to receive a load of an occupant seated on the vehicle seat;
the load receiving portion includes a large thickness portion and a small thickness portion that are located next to each other in a first direction that intersects with a thickness direction of the cover;
each of the large thickness portion and the small thickness portion includes an elastic layer which is compressive in the thickness direction and a lower cover layer located closer to the cushion material than the elastic layer in the thickness direction;
the elastic layer of the small thickness portion is compressed such that the thickness of the small thickness portion is smaller than the thickness of the large thickness portion; and
the lower cover layer of the large thickness portion is partially cut off to form a cutoff portion.

2. The vehicle seat according to claim 1, wherein:
the small thickness portion includes a first extending portion that extends in the first direction where the large thickness portion and the small thickness portion are located next to each other and a second extending portion that extends to intersect with the first extending portion; and
the large thickness portion is located next to the second extending portion to extend along the second extending portion.

3. The vehicle seat according to claim 2, wherein:
the small thickness portion includes a pair of second extending portions that are spaced apart from each other and include the second extending portion; and
the cutoff portion is formed in the lower cover layer of the large thickness portion positioned to be interposed between the pair of second extending portions.

4. The vehicle seat according to claim 3, wherein:
the pair of second extending portions is spaced apart from each other in a front to back direction of the vehicle seat; and
each of the pair of second extending portions, the large thickness portion positioned to be interposed between the pair of second extending portions, and the cutoff portion extend in a width direction of the vehicle seat.

5. The vehicle seat according to claim 1, wherein:
the cover further includes an upper cover layer separated further from the cushion material than the elastic layer in the thickness direction;
the elastic layer is interposed between the lower cover layer and the upper cover layer;
the lower cover layer of the small thickness portion is continuously formed with the lower cover layer of the large thickness portion; and
the upper cover layer of the small thickness portion is continuously formed with the upper cover layer of the large thickness portion.

6. The vehicle seat according to claim 1, wherein the cutoff portion is a cut formed in the lower cover layer.

7. The vehicle seat according to claim 1, wherein the cutoff portion is a hole formed in the lower cover layer.

8. The vehicle seat according to claim 1, wherein the cutoff portion is provided at a central portion of the lower cover layer of the large thickness portion in the first direction where the large thickness portion and the small thickness portion are located next to each other.

9. The vehicle seat according to claim 1, wherein:
the vehicle seat is a straddle seat on which an occupant can sit straddled; and
the load receiving portion is a portion of the cover on which the buttocks of the occupant seated on the vehicle seat are rested.

* * * * *